United States Patent [19]
Kikinis

[11] Patent Number: 5,706,336
[45] Date of Patent: *Jan. 6, 1998

[54] TELEPHONE SYSTEM CIRCUITRY FOR DISCRIMINATING BETWEEN VOICE AND DATA TRANSMISSIONS

[75] Inventor: Dan Kikinis, Saratoga, Calif.

[73] Assignee: Elonex I.P. Holdings, Ltd., London, United Kingdom

[*] Notice: The term of this patent shall not extend beyond the expiration date of Pat. No. 5,491,744.

[21] Appl. No.: 548,449

[22] Filed: Oct. 26, 1995

Related U.S. Application Data

[62] Division of Ser. No. 497,921, Jun. 30, 1995, Pat. No. 5,491,744.

[51] Int. Cl.$^6$ .......................... H04M 11/00; H04M 3/42
[52] U.S. Cl. ..................... 379/93.01; 379/93.05; 379/93.35; 379/215; 379/399
[58] Field of Search .................. 379/215, 93, 94, 379/96, 98, 201, 399, 93.01, 93.05, 93.09, 93.35; 370/79, 17, 60.1

[56] References Cited

U.S. PATENT DOCUMENTS

| | | | |
|---|---|---|---|
| 4,310,727 | 1/1982 | Lawser | 379/207 |
| 4,757,496 | 7/1988 | Bartholet et al. | 370/85 |
| 5,267,301 | 11/1993 | Nishii | 379/93 |
| 5,287,401 | 2/1994 | Lin | 379/215 X |
| 5,428,608 | 6/1995 | Freeman et al. | 379/93 |
| 5,479,498 | 12/1995 | Brandman et al. | 379/283 |
| 5,491,744 | 2/1996 | Kikinis | 379/215 |

*Primary Examiner*—Harry S. Hong
*Attorney, Agent, or Firm*—Donald R. Boys

[57] ABSTRACT

A selective call-waiting system for telephony use samples transmission on a busy line if the line subscribes to the selective call-waiting service, and avoids interrupting the transmission with a call-waiting signal if the transmission is data-type. If the transmission on the busy line subscribing to the selective call-waiting service is voice-type, the system sends a call-waiting signal. Signal analyzers are disclosed, as well as methods for practicing the invention.

3 Claims, 2 Drawing Sheets

TELEPHONE SYSTEM CIRCUITRY FOR DISCRIMINATING BETWEEN VOICE AND DATA TRANSMISSIONS

CROSS-REFERENCE TO RELATED DOCUMENTS

The present application is a division of application Ser. No. 08/497,921 filed Jun. 30, 1995; now U.S. Pat. No. 5,491,744.

FIELD OF THE INVENTION

The present invention is in the area of telephone-service features, and is particularly relevant for telephone service to single-line subscribers.

BACKGROUND OF THE INVENTION

Many telephone companies provide custom calling services such as Call Waiting, Repeat Dialing, Priority Ringing, Select Call Forwarding, and other services. These services involve tone signals to alert subscribers as well as manipulation of telephone line switches to ensure proper connections. Tone signals and line switches, however, may be are a serious problem for a subscriber who uses a single telephone line for both voice and data transmission.

Call Waiting is a service that alerts a single-line subscriber that another call is waiting, by interrupting a call in progress with a repeated tone burst. So the calling party won't hear the same tone burst (or echo), line switches are opened for the duration of the tone bursts. The calling party will notice just a brief interruption of the voice. Other service features use different tones and signal patterns, but they all have in common that tone signaling and line switching at least briefly interrupt a call in progress.

Since tone bursts are brief, they do not significantly effect the intelligibility of a conversation. However, considering the case of data transmission, any interruption that lasts long enough to mask bits in a digital data stream can cause major problems in data transmissions. For example, a single-line subscriber may use a line alternatively for voice calls or data-type transmission such as, but not limited to, fax or e-mail. If a Call Waiting tone burst interrupts a data transmission, data bits are lost and at least part of the data transmission is useless.

Many telephone companies provide a Suspend Call Waiting feature, which eliminates the interference problem only for an originator of a call. That is, a subscriber can temporarily suspend the Call Waiting feature by dialing a sequence of digits, such as *70 for a touch-tone phone and 1170 for a rotary phone, before dialing a telephone number. By suspending the Call Waiting feature, subscribers can send transmissions free of Call Waiting interruptions. When a call is completed, the Call Waiting feature is automatically restored.

Unfortunately, even with a Suspend feature a Call Waiting tone burst remains a serious problem in the event a data-type transmission is received, because a subscribers cannot suspend the Call Waiting feature when receiving a call.

What is clearly needed is a system that provides a Selective Call Waiting feature. This feature would function basically the same as the Call Waiting feature, but in addition, it would provide an ability to check a subscriber's telephone line to ascertain whether a call in progress is a data-type or voice-type transmission.

In Selective Call Waiting according to the present invention, if a data-type transmission is detected, the selective Call Waiting feature suspends alert signals and sends a busy signal to any calling party. If voice-type transmission is detected, the Selective Call Waiting feature alerts the called party with a brief, repeated tone and sends simultaneously a ring signal to the calling party.

SUMMARY OF THE INVENTION

In a preferred embodiment, a method for operating a selective call-waiting service is provided, comprising steps of (a) receiving an incoming call and determining its destination; (b) determining if destination line is in use; (c) if destination number is not in use, routing incoming call to destination number; (d) if destination number is in use, checking subscription information to determine if destination number has call-waiting service; (e) if destination number has call-waiting service, checking destination line for voice-type or data-type transmission; (f) if data-type transmission, sending a busy signal to the incoming caller, and no signal to the destination line; (g) if voice-type transmission, sending a call-waiting signal to the destination line.

If the destination number has no subscription to the selective call-waiting service, but does have conventional call-waiting, the action is conventional for this case, and if there is no subscription to any call-waiting, the action is also conventional for this case.

The selective call-waiting system is integrated with conventional computerized telephone switching systems based on a CPU by adding signal analyzing circuitry for determining whether transmission on a line in use is voice-type transmission or data-type transmission, and control routines for the CPU determining transmission type from the signal analyzing circuitry, and sending appropriate signals on the incoming and the destination lines.

In embodiments according to the invention, alternative ways are provided for adapting transmission signal analysis to conventional telephone switching systems. In one embodiment, a stand-alone signal analyzer is provided for adapting to a conventional line card, and in another embodiment, signal analysis is integrated with line cards.

DESCRIPTION OF THE PREFERRED EMBODIMENTS

General Description

Figure 1:
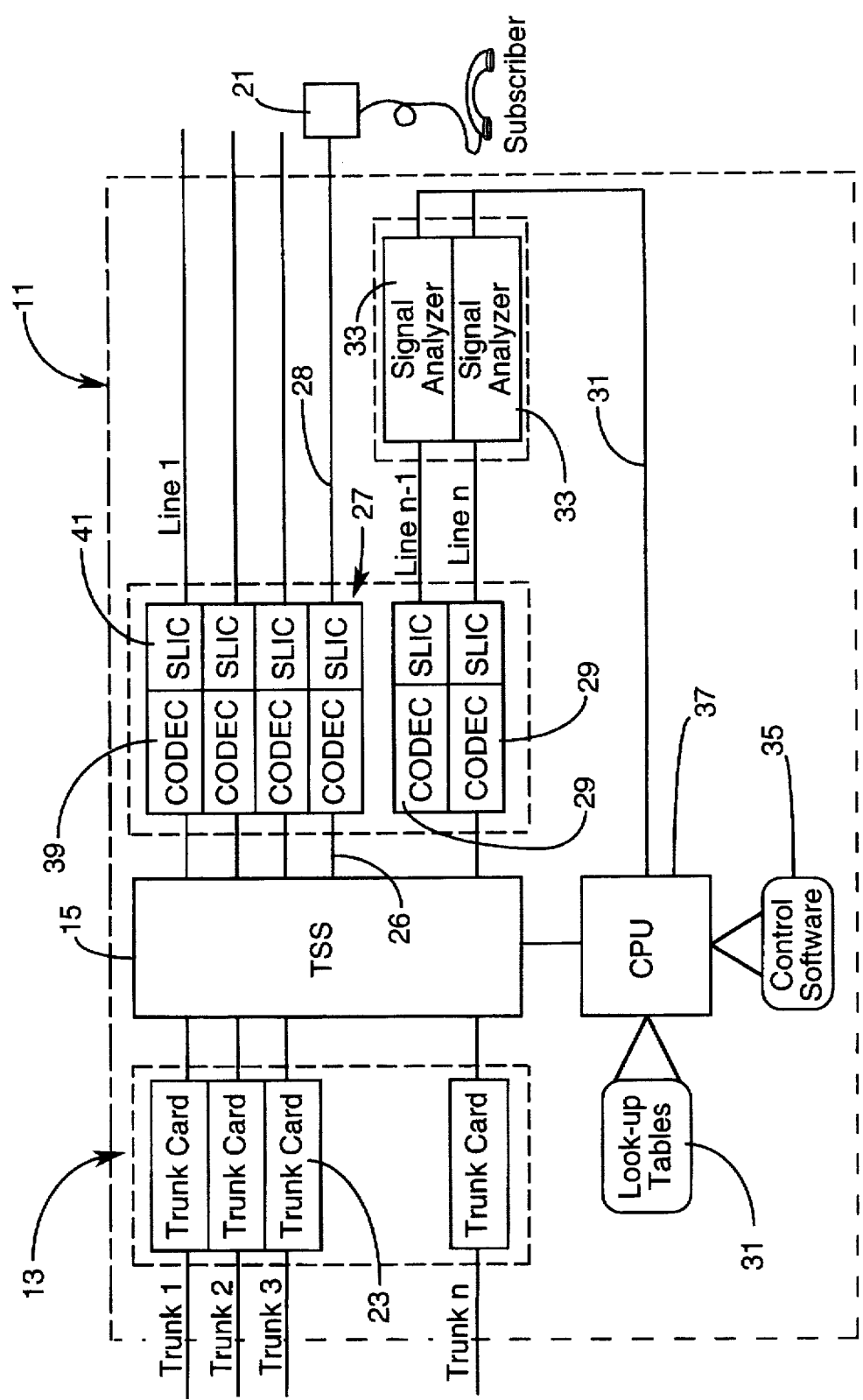
FIG. 1 is a block diagram of a central telephone switching system connected to a single subscriber terminal according to an embodiment of the present invention.

FIG. 1 is a block diagram of a central telephone switching system 11 connected to a subscriber terminal 21 according to an embodiment of the present invention. Central telephone system 11 comprises a time-slot switch (TSS) 15, a set of line cards 27, a set of trunk cards 23, and a telecommunication CPU 37 having well-known elements of such a CPU, including control software 35 and look-up tables 31.

In the embodiment shown by FIG. 1, for example, a transmission signal originating from a calling party and destined for subscriber terminal 21, termed the called party, might enter TSS 15 through a trunk card 23.

As is well known in the art in state-of-the-art equipment, transmissions that enter a trunk card are digitally encoded, and may contain various data or voice transmissions as well as the destination of each transmission. Telecommunication CPU 37 can extract information about the destination of a particular transmission and configure TSS 15 to route the transmission to that destination. The destination can be, for example, a line card 27. Line card 27 is connected to TSS 15 by interface 26 and to subscriber terminal 21 by interface 28.

Once line card 27 receives a transmission, it decodes the transmission by means of coder-decoder device (CODEC) 39 and sends the decoded transmission through a subscriber line interface circuit (SLIC) 41 to subscriber terminal 21. In the event that a transmission destined for subscriber terminal 21 arrives at TSS 15 while another call is already in progress at subscriber terminal 21, CPU 37 checks look-up tables 31 for subscriber terminals having Call Waiting service.

If subscriber terminal 21 is found in look-up tables 31, CPU 37 directs TSS 15 to connect SLIC 41 for a brief time to a tone generator on line card 27. The tone alerts a called party at subscriber terminal 21 that a second call is waiting to be answered. The called party may then switch between the two calls as desired. If subscriber terminal 21 is not found in look-up tables 31, CPU 37 directs TSS 15 to send a busy signal to the calling party.

Selective Call Waiting

With Selective Call Waiting according to an embodiment of the present invention, one or more signal analyzers 33 are connected to line cards 29. Signal analyzers according to the present invention provide CPU 37 with an ability to monitor and analyze any transmission entering or leaving a TSS.

There are many different ways a signal analyzer might work. In the event a signal analyzer detects a transmission signal that exhibits data-transmission characteristics, it may produce, for example, a digital non-zero bit at its output terminal. Conversely, if a signal generator detects voice-transmission characteristics it may produce, for example, a digital zero bit at its output terminal. It will be apparent to one with skill in the art that there are many possible variations to distinguish between a voice or data-type transmission at an output terminal of a signal analyzer.

As is well known in the telecommunication art, transmissions emerging from line cards are analog in nature and are relatively simple to analyze by means of discrete Fourier Transform (DFT) or fast Fourier transform (FFT) and the like. Furthermore, signal analyzers need not be independent devices. They may take the form of a line card according to the present invention, replacing a conventional line card.

All signal analyzers in the embodiment described by FIG. 1 are connected to CPU 37 by means of a communication link 31, which might take the form, but not is limited to, an RS-232, a LAN or an Ethernet network. Those with skill in the art will recognize that the technology of communication networks is old in the art, and that this portion of the present invention may be implemented with little difficulty by those with skill in the art, using well-known equipment and techniques.

Selective Call Waiting Procedures

Figure 2:
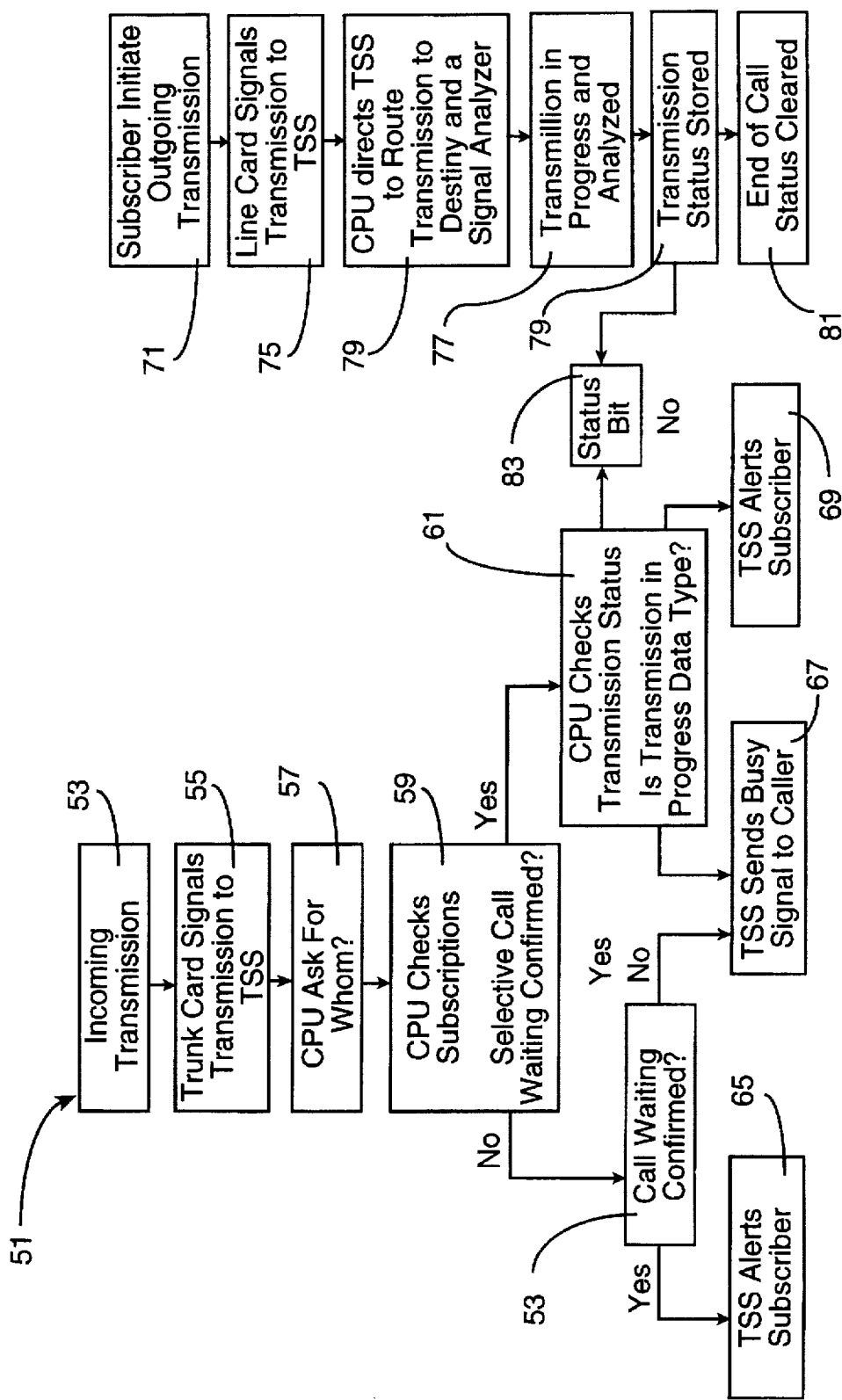
FIG. 2 is a flow diagram describing a Selective Call Waiting procedure according to an embodiment of the present invention.

FIG. 2 is a flow diagram describing a Selective Call Waiting procedure according to the embodiment of FIG. 1. The procedure starts at step 71 where a subscriber, connected to subscriber terminal 21 (FIG. 1), initiates a transmission by taking a telephone off the hook. The hook switches close, and cause a DC loop current to flow.

At step 73, line card 27 (FIG. 1) senses the current and requests CPU 37 (FIG. 1) for service. This sensing process is well-known to those with skill in the art. At step 75, CPU 37 directs a TSS to route the transmission to its destination and also directs the TSS to forward a copy of the transmission to signal analyzer 33 (FIG. 1), or any other signal analyzer that is available at that moment.

Next, at step 77, CPU 37 (FIG. 1) directs signal analyzer 33 (FIG. 1) to analyze the transmission. If signal analyzer 33 (FIG. 1) detects a data-type transmission it outputs a signal accordingly. The status of the transmission type is stored at step 79 by setting a status bit 83. When the analyzed transmission terminates at step 81, the status of the output of signal-analyzer 33 is cleared.

At step 53 in this embodiment, a transmission destined for subscriber terminal 21 (FIG. 1) arrives at trunk card 23 (FIG. 1) at the same time a transmission is in progress at subscriber terminal 21 (FIG. 1). At step 55 this trunk card signals CPU 37 (FIG. 1) via TSS 15 for service. CPU 37 responds and extracts at step 57 the destination information for the transmission.

Next, at step 59, CPU 37 checks look-up tables 31 to ascertain whether the called party is a Selective Call Waiting subscriber. If the called party has no Selective Call Waiting service, the CPU proceeds at step 63 to check for Call Waiting service. If no Call Waiting service is found for the called party, TSS 15 sends a busy signal to the calling party at step 67. If conventional Call Waiting service is confirmed for the called party, TSS 15 sends at step 65 an alert signal to the called party.

Referring again to step 59, in the event Selective Call Waiting service is confirmed for the called party, CPU 37 checks at step 61 the previously stored status bit 83 of a transmission analysis of the called party. If the stored status bit indicates data-type transmission, TSS 15 (FIG. 1) sends at step 67 a busy signal to the calling party. If the status bit indicates voice-type transmission or no transmission, TSS 15 (FIG. 1) proceeds at step 69 to alert subscriber 21 (FIG. 1) respectively with a tone or ring signal.

At step 81 at the end of a transmission, stored status bit 83 is cleared.

In an alternate embodiment of the present invention, Selective Call Waiting protects an incoming data-type transmission from being interrupted by a TSS generated alert signal. This protection can be implemented at the time of the call by having CPU 35 direct TSS 15 to connect a signal analyzer to the line card of a called party.

A signal analyzer might identify the data-type transmission by waiting for a carrier tone or actual data transmission. If after a certain time no carrier or data is detected, the transmission is assumed to be voice type, and Selective Call Waiting signals are permitted to interrupt a transmission in progress.

In still another embodiment of the present invention, signal analyzers might also be connected to trunk cards. Since a TSS can connect any trunk or line card to any other trunk or line card, a CPU can direct a TSS to copy a transmission arriving at a trunk card to any trunk or line card that has a signal analyzer connected. A signal analyzer may also take the form of, but is not limited to, a card that fits in the slot of a trunk or line card. Hence, a signal-analyzer card might then replace a trunk or line card.

As described above, analyzers may be connected to a CPU by means of a communication link which may take the form, but not is limited to, an RS-232, a LAN or an Ethernet network. In yet another embodiment of the present invention, signal analyzers connected to line cards, may also communicate with a CPU by means of flashing, eliminating the need for RS-232, LANs or the like. Flashing is a well-known term in telecommunication technology, and it refers to a subscriber briefly pressing the telephone hook. A flash may be generated by a signal analyzer by briefly interrupting a DC-loop current, which is well known by those with skill in the art.

It will be apparent to those with skill in the art that many alterations may be made in the embodiments described without departing from the spirit and scope of the invention. Many such alterations have already been described.

What is claimed is:

1. A signal-analyzer plug-in card comprising:

an interface adapted for connecting to a subscriber line interface circuit (SLIC);

discrimination circuitry coupled to the interface and adapted for determining between voice signals and data signals in an ongoing established communication between two active terminals; and a digital communication port adapted for communication with a CPU;

wherein the discrimination circuitry determines the voice or data nature of the established communication, and communicates the voice or data nature to the CPU via the digital communication port.

2. A line card for a telephone switching system, comprising:

a first interface for connecting the line card to a time-slot switch (TSS) and a second interface for connecting the line card to a subscriber line; and discrimination circuitry coupled to the second interface and adapted for determining between voice signals and data signals in an ongoing communication;

wherein the line card is adapted to communicate with a CPU through the TSS to inform the CPU on command of voice or data nature of telephone signals carried by the line card.

3. A trunk card for a telephone switching system, comprising:

a first interface for connecting the trunk card to a time-slot switch (TSS) and a second interface for connecting the trunk card to a trunk; and discrimination circuitry coupled to the second interface and adapted for determining between voice signals and data signals in an ongoing communication;

wherein the trunk card is adapted to communicate with a CPU through the TSS to inform the CPU on command of voice or data nature of telephone signals carried by the trunk card.

* * * * *